United States Patent

Jutte et al.

[11] Patent Number: 6,147,956
[45] Date of Patent: Nov. 14, 2000

[54] OPTICAL PICKUP USING A PLANO-CONVEX LENS AS AN OBJECTIVE LENS FOR FOCUSING TWO LIGHT BEAMS

[75] Inventors: Petrus T. Jutte; Jorrit E. De Vries, both of Eindhoven, Netherlands

[73] Assignee: U.S. Philips Corporation, New York, N.Y.

[21] Appl. No.: 09/310,485

[22] Filed: May 12, 1999

[30] Foreign Application Priority Data

May 13, 1998 [EP] European Pat. Off. .............. 98201565

[51] Int. Cl.[7] ....................................................... G11B 7/00
[52] U.S. Cl. .................. 369/112; 369/44.23; 369/94; 369/121
[58] Field of Search .......................... 369/112, 94, 44.37, 369/44.23, 44.24, 13, 122, 121, 58; 359/379

[56] References Cited

U.S. PATENT DOCUMENTS

| | | | |
|---|---|---|---|
| 3,924,063 | 12/1975 | Simons | 369/112 |
| 4,563,062 | 1/1986 | Kanatani | 359/379 |
| 4,855,987 | 8/1989 | Versluis | 369/112 |
| 5,307,328 | 4/1994 | Jacobs et al. | 369/13 |
| 5,608,708 | 3/1997 | Ophey | 369/109 |
| 5,615,200 | 3/1997 | Hoshino et al. | 369/112 |
| 5,708,638 | 1/1998 | Braat et al. | 369/112 |
| 5,754,504 | 5/1998 | Yamazaki et al. | 369/44.23 |
| 5,872,761 | 2/1999 | Sugi et al. | 369/112 |
| 5,883,874 | 3/1999 | Choi | 369/112 |
| 5,926,450 | 7/1999 | Braat | 369/58 |
| 5,933,401 | 8/1999 | Lee et al. | 369/112 |

Primary Examiner—Do Hyun Yoo
Assistant Examiner—Kim-Kwok Chu
Attorney, Agent, or Firm—Michael E. Belk

[57] ABSTRACT

A scanning device is designed for optically scanning a first record carrier (1) having a first information plane (3) and a first transparent layer (2) of a first thickness and for scanning a second record carrier (18) having a second information plane (20) and a second transparent layer (19) of a second thickness different from the first thickness. The device comprises a radiation source (5, 22) for generating a radiation beam (6, 23) and an objective lens (9) for focusing the radiation beam through one of the transparent layers on one of the information layers. The radiation source comprising means for adapting the vergency of the radiation beam to a first value for scanning the first record carrier and to a second value for scanning the second record carrier. The objective lens has a convex surface (28) and a concave surface (29), the convex surface facing towards the radiation source. The combination of the change in vergency and the concave surface provides a large field of the objective lens, both when scanning the first and second record carrier.

5 Claims, 3 Drawing Sheets

6,147,956

OPTICAL PICKUP USING A PLANO-CONVEX LENS AS AN OBJECTIVE LENS FOR FOCUSING TWO LIGHT BEAMS

BACKGROUND OF THE INVENTION

The invention relates to a scanning device for optically scanning a first record carrier having a first information plane and a first transparent layer of a first thickness and for scanning a second record carrier having a second information plane and a second transparent layer of a second thickness different from the first thickness, comprising a radiation source for generating a radiation beam and an objective lens for focusing the radiation beam through one of the transparent layers on one of the information layers.

The transparent layer in optical record carriers has, in general, the function of protecting the information layer against environmental influences and providing mechanical support for the record carrier, i.e. it acts as a substrate for the information layer. The thickness of the transparent layer is a compromise between the desired stiffness of the record carrier and the numerical aperture of the radiation beam used for scanning the information layer. If for a new type of record carrier the numerical aperture is increased in order to increase the storage density of the information layer, it is often necessary to reduce the thickness of the transparent layer in order to reduce the influence of disc tilt on the quality of the radiation beam. As a consequence, there will be different types of record carrier on the market, having different thicknesses of the transparent layer. A compatible record player should be able to scan all types of record carrier, irrespective of the thickness of the transparent layer. An example of the first record carrier is the so-called DVD, having a transparent layer of 0.6 mm thickness and designed for being scanned at a wavelength between 630 and 650 nm. An example of the second record carrier is the so-called CD, having a transparent layer of 1.2 mm thickness and designed for being scanned at a wavelength between 780 and 820 nm.

The transparent layer, through which a radiation beam scans the information layer, introduces a so-called spherical aberration in the radiation beam. The spherical aberration is compensated in the objective lens, making the radiation beam near its focus substantially free from spherical aberration. If an objective lens compensated for a first thickness of the transparent layer is used for scanning a record carrier with a transparent layer of a second thickness, the focus will be deteriorated due to the under- or over-compensated spherical aberration.

A device for scanning optical record carriers having transparent layers of different thicknesses is disclosed from the U.S. Pat. No. 5,615,200. This known device uses a radiation source comprising two diode lasers at different distances from the objective lens. A high-density record carrier having a thin substrate is scanned using a first vergence of the radiation beam, while a low-density record carrier having a thick substrate is scanned using a second vergency of the radiation beam. The change in vergency is achieved by using two diode lasers emitting at the same wavelength but positioned at different distances from the objective lens. The objective lens is designed for optimum performance when scanning the high-density record carrier. A disadvantage of the known device is that its performance is unsatisfactory when scanning the low-density record carrier.

SUMMARY OF THE INVENTION

It is an object of the invention to provide a device for optically scanning a record carrier, which has a reliable, high performance, irrespective of the type of record carrier being scanned.

The object is met with an objective lens having a convex surface and a concave surface, the convex surface facing towards the radiation source, and the radiation source comprising means for adapting the vergence of the radiation beam to a first value for scanning the first record carrier and to a second value for scanning the second record carrier.

The invention is based in the recognition that the unsatisfactory performance of the known device is due to the limited field of the objective lens when scanning the low-density record carrier. During scanning the transverse tracking of the radiation beam is often accomplished by controlling the transverse position of the objective lens. A limited field of the objective lens results in large optical aberrations when the objective lens has moved near the end of its transverse position range. The large optical aberrations reduce the quality of the signals obtained from the record carrier.

It has turned out that the field of the objective can be made relatively large for both types of record carrier when the surface of the objective lens facing the record carrier is made convex. This means that the surface is hollow over its effective diameter, even though the surface may have locally a convex region. The first step of the design of the objective lens is to optimize the performance of the lens for the most demanding first type of record carrier, in general a high-density record carrier having a thin transparent layer. The field of the objective lens when scanning this record carrier will be made as large as possible in order to increase the manufacturing tolerances of the device. The second step of the design is to increase the field of the objective lens when scanning the second type of record carrier, while monitoring the size of the field when scanning the first type of record carrier. In general, the combination of the objective lens and the change in vergence allows a substantial increase of the field for the second type of the record carrier, while the reduction of the field for the first type of record carrier is relatively small. An increase by a factor of two may be realized at the expense of a reduction of 10%, which reduction hardly affects the performance of the scanning device when scanning a first record carrier.

DETAILED DESCRIPTION OF THE PREFERRED EMBODIMENTS

Figure 1A:
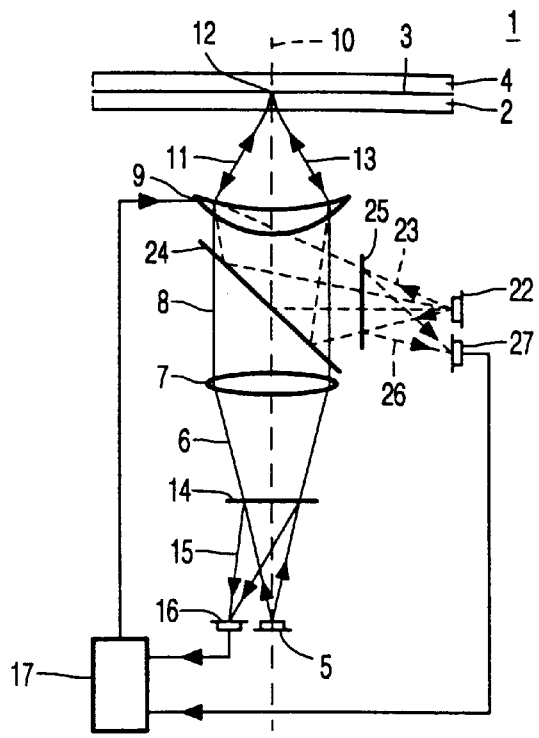
FIG. 1A shows a device according to the invention scanning a first record carrier.

FIG. 1 A shows a device for scanning an optical record carrier 1. The record carrier comprises a transparent layer 2, on one side of which an information layer 3 is arranged. The side of the information layer facing away from the transparent layer is protected from environmental influences by a protection layer 4. The transparent layer 2 acts as a substrate for the record carrier by providing mechanical support for the information layer. The transparent layer may have the sole function of protecting the information layer, while the mechanical support is provided by a layer on the other side of the information layer, for instance by the protection layer 4. Information can be stored in the record carrier in the form of optically detectable marks arranged in substantially parallel tracks, not indicated in the Figure. The marks may be in the form of pits, areas with a reflection coefficient or a direction of magnetization different from its surroundings, or a combination of these forms.

The scanning device comprises a first radiation source 5, for instance a semi-conductor laser, emitting a diverging radiation beam 6 at a wavelength of 650 nm. A collimator lens 7 transforms diverging beam 6 to a collimated beam 8. An objective lens 9, having an optical axis 10, transforms collimated radiation beam 8 to a converging beam 11, which forms a focal spot 12 on information layer 3. Although the objective lens is indicated in the Figure as a single lens element, it may also comprise a combination of two or more lenses. Radiation of converging beam 11 reflected by information layer 3, which forms a reflected beam 13, returns on the optical path of forward converging beam 11. After objective lens 9 a beam splitter 14, for instance a diffraction grating, splits a part of reflected beam 13 out of the optical path of the forward beam and forms a detection beam 15. Radiation of the detection beam is captured by a detection system 16, which converts the optical power in electrical signals. The electrical signals are supplied to an electric processing circuit 17. One of these signals is an information signal, the value of which represents the information read from information layer 3. Another signal is a focus error signal, the value of which represents the axial difference in height between focal spot 12 and information layer 3. The focus error signal is used as input for a focus servo controller, which controls the axial position of objective lens 9, thereby controlling the axial position of the focal spot 12. Another signal is the radial error signal, the value of which represents the transverse distance between the centre of focal spot 12 and the centre line of the track along which the spot should scan. The transverse distance on a disc-shaped record carrier is equal to the radial distance. The radial error signal is used as input for a radial servo controller, which controls the transverse position of objective lens 9, thereby controlling the transverse position of focal spot 12. The two servo controllers form part of processing circuit 17.

Figure 1B:
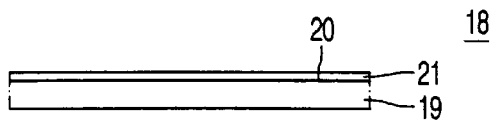
FIG. 1B shows a second record carrier.

FIG. 1B shows a second record carrier 18 similar to first record carrier 1. Record carrier 18 comprises a transparent layer 19, on one side of which an information layer 20 is arranged. The side of the information layer facing away from the transparent layer is protected by a protection layer 21. The transparent layer 2 acts as a substrate for the record carrier by providing mechanical support for the information layer and is thicker than transparent layer 2 of record carrier 1. When the scanning device shown in FIG. 1A is used to scan record carrier 2, a second radiation source 22 emits a diverging radiation beam 23, which may have a wavelength different from that of radiation beam 6. A beam splitter 24 directs the beam towards objective lens 9. The beam splitter is preferably wavelength selective if sources 5 and 22 emit different wavelengths or polarisation sensitive if beams 6 and 23 have different states of polarization. Objective lens 9 focuses the beam on information layer 20. Radiation of reflected by information layer 20, returns on the optical path of forward beam. After objective lens 9 and beam splitter 24, a further beam splitter 25, for instance a diffraction grating, splits a part of the reflected beam out of the optical path of the forward beam and forms a detection beam 26. Radiation of the detection beam is captured by a detection system 27, which converts the optical power in electrical signals. The electrical signals are supplied to an electric processing circuit 17. The processing circuit will process the signals from that detector which pertains to the type of disc being scanned, i.e. from detector 16 when scanning first record carrier 1 and from detector 27 when scanning second record carrier 18.

The means in the device shown in FIG. 1A for adapting the vergence of the radiation beam 6, 23 to a first value for scanning the first record carrier and to a second value for scanning the second record carrier are formed by two source-detector units 5, 16 and 22, 27. Since each source generates a radiation beam having a different vergence when entering objective lens 9, a simple switching of the electrical power between the two sources changes the vergence of the radiation beam. Although the wavelengths of the two sources in the device shown are different, it will be clear that the device can also operate with two sources having the same wavelength. Another embodiment of the means for adapting the vergence comprises a single radiation source the position of which with respect to the objective lens can be changed in dependence on the type of record carrier being scanned. A further embodiment of the means comprises a single radiation source arranged at a fixed position and an optical element, e.g. a lens, that can be moved in and out of the optical path or an optical element in the optical path that can be switched on and off.

The numerical aperture of converging beam 11 may be different when scanning the first or the second record carrier. The difference can be realised by arranging a fixed aperture in the non-common part of the optical path of both radiation beams, i.e. the path of the radiation beam between each radiation source 5, 22 and the beam splitter 24, or by arranging a dichroic aperture in the common path of the radiation beams, i.e. between beam splitter 24 and the record carrier 1 or 18.

Figure 2:
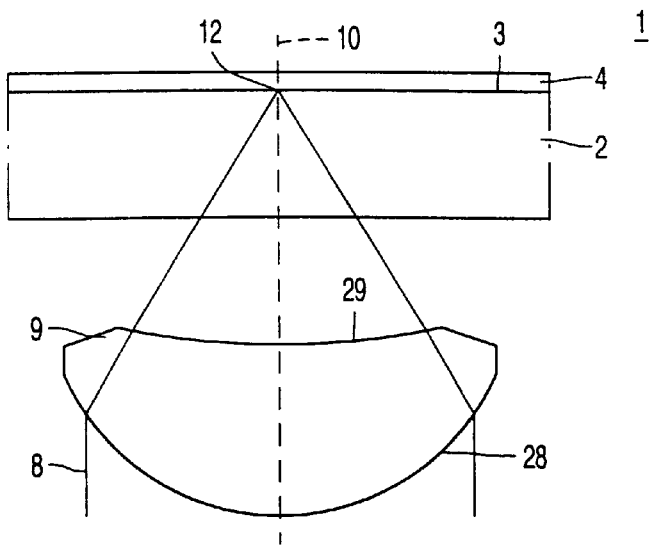
FIG. 2 shows an objective lens according to the invention.
Figure 3A:
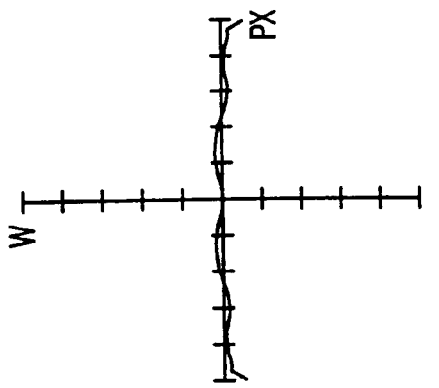
FIGS. 3A and 3B show aberration curves of an embodiment of the objective lens.
Figure 3A:
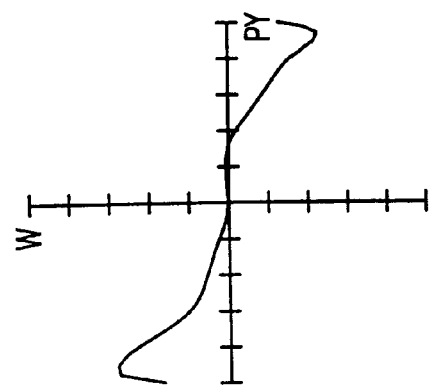
Figure 3A:
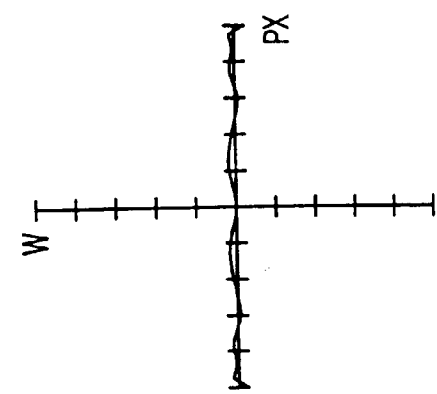
Figure 3A:
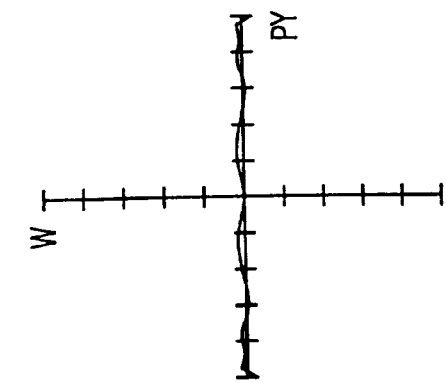
Figure 3B:
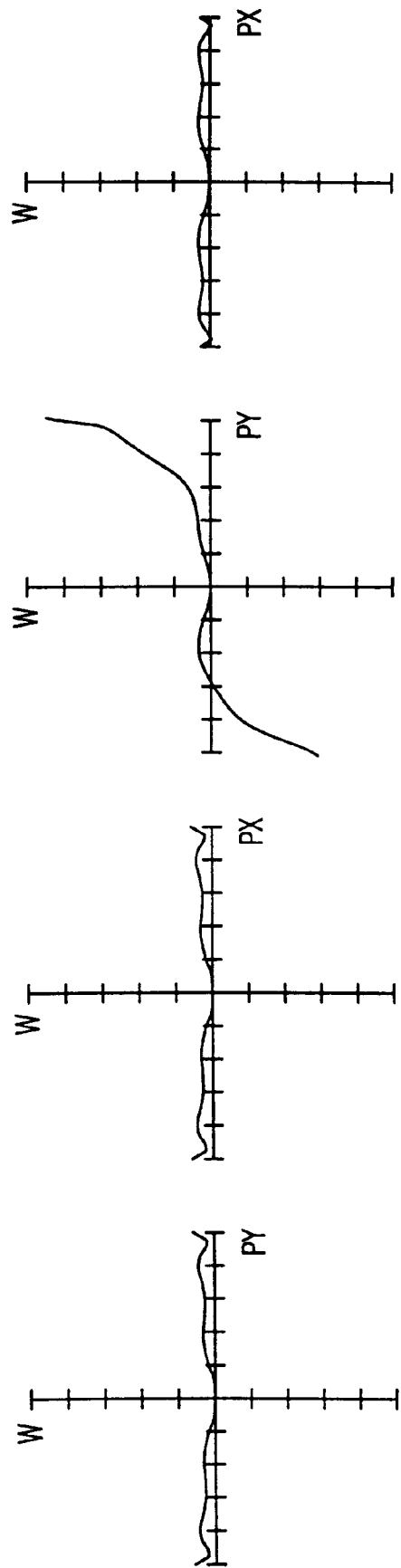

FIG. 2 shows record carrier 1 and objective lens 9 according to the invention. The lens is designed to converge a collimated 650 nm radiation beam through a 0.6 mm transparent layer of polycarbonate with a numerical aperture of 0.592 onto information layer 3, and to converge a 780 nm radiation beam from a radiation source at a distance of ~20 mm from the convex surface of lens 9 through a 1.2 mm transparent polycarbonate layer with a numerical aperture of 0.477 onto information layer 20. The distance of ~20 mm between the radiation source and the objective lens may be reduced by arranging a converging lens between the radiation source and the objective lens; in that case the radiation source is located at a virtual position ~20 mm from the objective lens. The body of the lens is made of glass LAL10 from the Schott catalog, which has a refractive index of 1.7160 at a wavelength of 650 nm. The objective lens has a convex surface 28 and a concave surface 29. A first embodiment of the objective lens has a spherical concave surface 28, having a radius of 1.348 mm. The thickness of the lens on the optical axis is equal to 0.97 mm. Concave surface 29 is aspheric. The polynomial expansion of the aspheric surface has the coefficients −0.029459894, 0.14559995, −0.040313125, 0.028055878 and −0.0081105165 for the even powers $r^2$ to $r^{10}$ of the radius r as measured from optical axis 10, where r is normalised on the effective maximum radius of concave surface 29 and a positive value of the expansion is in the direction of the record carrier. The aspheric profile is applied on the glass body of the lens by means of the replication technique, in which a thin layer of lacquer is applied to the lens body, pressed into the required form by a mould and subsequently hardened by UV light. The refractive index of the lacquer is 1.56 and its thickness on the optical axis is 5 μm. The focal length of the objective lens is 1.817 mm in air and the distance from the virtual position of the radiation source to the convex surface of the objective lens is equal to.

The RMS wavefront error near focal point 12 when focusing the 650 nm radiation beam is 22 mλ on the optical axis and 46 λ when the collimated beam makes an angle of 0.7° with optical axis 10. When focusing the 780 nm radiation beam, the RMS wavefront error is 20 mλ on the optical axis and 45 λ when the axis of the diverging beam 23 makes an angle of 0.7° with optical axis 10.

This optical performance should be compared with the optical performance of a known design for an objective lens. This lens is plano-convex, the plane side facing the record carrier. The lens is designed to converge a collimated 650 nm radiation beam through a 0.6 mm transparent layer of polycarbonate with a numerical aperture of 0.606 onto information layer 3, and to converge a 780 nm radiation beam from a distance of 23 mm from the convex surface of the objective lens through a 1.2 mm transparent polycarbonate layer with a numerical aperture of 0.474 onto information layer 20. The body of the lens is made of glass LAL10 from the Schott catalog, which has a refractive index of 1.7104 at a wavelength of 780 nm. The objective lens has a spherical concave surface 28, having a radius of 1.41 mm. The thickness of the lens on the optical axis is equal to 0.97 mm. The convex surface is aspheric. The polynomial expansion of the aspheric surface has the coefficients 0.04260032, 0.024518779, −0.0003232844, −0.0000061415 and −0.00085391066 for the even powers $r^2$ to $r^{10}$ of the radius r. The effective focal length is 1.8148 mm. The aspheric profile is applied on the glass body of the lens by means of the replication technique, in which a thin layer of lacquer is applied to the lens body, pressed into the required form by a mould and subsequently hardened by UV light. The refractive index of the lacquer is 1.56 and its thickness on the optical axis is 16 μm.

When the known objective lens focuses the 650 mn radiation beam, the RMS wavefront error near the focal point is 2 λ on the optical axis and 25 mλ when the collimated beam makes an angle of 0.7° with the optical axis. When focusing the 780 nm radiation beam, the RMS wavefront error is 13 mλ on the optical axis and 76 mλ when the axis of the diverging beam 23 makes an angle of 0.7° with the optical axis. The 76 mλ wavefront error is not acceptable for most scanning devices, and, hence, the known objective lens has a reduced transverse position range for radial tracking.

A second embodiment of the objective lens according to the invention is based on the same design as the first embodiment, but the performance of the objective lens at 650 nm has been given a greater weight than in the first embodiment. The second embodiment of the objective lens has a spherical concave surface, having a radius of 1.332 mm. The thickness of the lens on the optical axis is equal to 0.97 mm. Convex surface 28 is aspheric. The polynomial expansion of the aspheric surface has the coefficients −0.024787881, 0.15503992, −0.045164808, 0.022478218 and 0.0022740594 for the even powers $r^2$ to $r^{10}$ of the radius r. The aspheric profile is applied on the glass body of the lens by means of the replication technique. The focal length of the objective lens is 1.810 mm in air and the distance from the virtual position of the radiation source to the convex surface of the objective lens is equal to ~23 mm.

The RMS wavefront error near focal point 12 when focusing the 650 nm radiation beam is 7 mλ on the optical axis and 39 mλ when the collimated beam makes an angle of 0.7° with optical axis 10. When focusing the 780 nm radiation beam, the RMS wavefront error is 31 mλ on the optical axis and 54 mλ when the axis of the diverging beam 23 makes an angle of 0.7° with optical axis 10. In comparison with the first embodiment, the performance at 650 nm is improved, whereas the performance at 780 nm is deteriorated, although the performance is sufficiently good to scan record carrier of the CD type at 780 nm.

A third embodiment of the objective lens according to the invention is also based on the same design as the first embodiment, but with zero curvature of the convex surface on the optical axis of the lens. Both concave and convex surfaces 29, 28 are aspheric in order to improve the manufacturability. Convex 28 surface has a radius of curvature of 1.3 mm and a superposed polynomial expansion with the following coefficients 0.003296000, 0.050121802, 0.005745544, 0.000716495, 0.020633612 for the even powers $r^2$ to $r^{10}$ of the radius r. The polynomial expansion of concave surface 29 has the following coefficients 0, 0.149675117, −0.245496713, 0.519433172 and −0.267128000 for the even powers $r^2$ to $r^{10}$ of the radius r. The aspheric profile is applied on the glass body of the lens by means of the replication technique. The focal length of the objective lens is 1.86 mm in air and the distance from the virtual position of the radiation source to the convex surface of the objective lens is equal to about 20 mm.

The RMS wavefront error near focal point 12 when focusing the 650 nm radiation beam is 7 mλ on the optical axis and 30 mλ when the collimated beam makes an angle of 0.7° with optical axis 10. When focusing the 780 nm radiation beam, the RMS wavefront error is 9 mλ on the optical axis and 50 mλ when the axis of the diverging beam 23 makes an angle of 0.7° with optical axis 10. In comparison with the first embodiment, the performance at 650 nm is improved, whereas the performance at 780 nm is deteriorated, although the performance is sufficiently good to scan record carrier of the CD type at 780 nmn.

FIG. 3 shows the aberration curves of the third embodiment of the objective lens. FIGS. 3A and 3B show the curves pertaining to the 650 nm and 780 nm wavelength respectively. The two aberration curves for two perpendicular directions on the left in each Figure are measured when the axis of the radiation beam coincides with the optical axis of the objective lens, whereas the two aberration curves for two perpendicular directions on the right in each Figure are measured when the axis of the radiation beam makes an angle of 0.7° with the optical axis of the objective lens. The horizontal axis of each aberration curve shows the normalized radius r in the pupil of the lens from −1 to +1. The vertical axis of each aberration curve show the wavefront deviation from −0.5 λ to +0.5 λ.

Although the described embodiments of the lenses are of the replica type, the lenses may also be made of a single material in the form of a pressed glass lens or a moulded plastic lens. When a relay lens is arranged between the radiation source and the objective lens, the distance between the radiation source and the convex surface of the objective lens is taken to be the distance between the virtual position of the radiation source and the convex surface.

What is claimed is:

1. A scanning device for optically scanning at different times a first record carrier having a first information plane and a first transparent layer of a first thickness and for scanning a second record carrier having a second information plane and a second transparent layer of a second thickness different from the first thickness, comprising:

a radiation source for generating a radiation beam; and an objective lens for focusing the radiation beam through one of the transparent layers on one of the information layers, the objective lens having a convex surface and a concave surface, the convex surface facing towards the radiation source;

and wherein the radiation source includes means for adjusting the vergency of the radiation beam to a first value for scanning the first record carrier and to a second value for scanning the second record carrier.

2. The device of claim 1, wherein the radiation source includes light emitting means for emitting radiation of a first wavelength when scanning the first record carrier and radiation of a second wavelength different from the first wavelength when scanning the second record carrier.

3. The device of claim 1, wherein at least one of the surfaces of the objective lens is aspherical.

4. The device of claim 1, wherein the vergency of the radiation beam for scanning the first record carrier is substantially equal to zero.

5. The device of claim 1, wherein a distance from a virtual position of the radiation source to the convex surface of the objective lens is larger than ten times a focal length of the objective lens.

* * * * *